United States Patent Office 3,544,391
Patented Dec. 1, 1970

3,544,391
PROCESS FOR LAMINATING ALUMINUM WITH A PLASTIC FILM
John A. Scott, 48 Grove Road, North Haven, Conn. 06473, and William H. Anthony, 11 Lovig Lane, Hamden, Conn. 06518
No Drawing. Continuation of application Ser. No. 448,288, Apr. 15, 1965. This application Sept. 26, 1968, Ser. No. 766,371
The portion of the term of the patent subsequent to Sept. 29, 1987, has been disclaimed
Int. Cl. C23f 7/06
U.S. Cl. 148—6.27
9 Claims

ABSTRACT OF THE DISCLOSURE

A process for treating aluminum articles to improve adhesion of paints and adhesive coatings thereto comprising contacting the aluminum with an amine or hydrazine in an aqueous solution having a pH of 7 to 11 at a temperature of 85° C. to boiling and then applying a coating of adhesive or paint to the aluminum article.

---

This application is a continuation of our copending application, Ser. No. 448,288, filed Apr. 15, 1965, now abandoned.

The present invention relates to a process for the treatment of aluminum and to an improved article obtained thereby. More particularly, the present invention resides in an improved process for treating aluminous metals which serves to improve the treated metal, for example, upon subsequent processing, such as painting or adhesive coating. The present invention further resides in the resultant treated and coated articles.

It is frequently desirable or necessary to paint or otherwise coat aluminum. For example, in architectural or ornamental applications, aluminum is frequently painted to improve its appearance for a particular application. Similarly, for many applications it is desirable to coat or clad aluminum with a dissimilar material, for example, a plastic film or a dissimilar metal or alloy.

It is generally necessary to pretreat the aluminum in some manner before coating in order to obtain adequate adhesion between the aluminum and the coating and to obtain adequate durability of the coating. For example, in the continuous application of paint to aluminum strip, it is accepted practice to apply a corrosion protecting conversion coating in the line prior to the paint application. The conversion coating is applied by contacting the metal strip with an aqueous, complex, chemical solution. For example, a typical chromate conversion coating solution which is used contains chromate, fluoride and cyanide ions.

These solutions are subject to the disadvantage that they require close pH control and careful regulation of the critical components of the complex solution.

In addition, conversion coatings are invariably applied in the preliminary stages of the paint strip line. If there is a delay before the paint is applied to the conversion coated surface, unacceptable adhesion and poor weathering endurance are apt to result. Still further, conversion coating equipment frequently requires a high proportion of the total capital outlay in the machinery and floor space required for the conversion coating stages. Further, the continuing cost of the chemical conversion coating treatment is quite expensive due to the high chemical cost, the difficult control problems and the high maintenance cost. An additional and troublesome problem with conversion coating or similar treatments is that frequently these treatments utilize high concentrations of chemical materials and high toxicity materials.

In addition to the foregoing significant and troublesome disadvantages attendant upon conventional pretreatment of aluminum, the conventional treatments frequently attain results which are either not acceptable or leave much to be desired.

Accordingly, it is a principal object of the present invention to provide an improved method for treating aluminum or aluminum base alloys which renders the metal susceptible to further coating processes.

It is an additional object to provide an improved article resulting from said treatment and further an improved coated article.

It is a further object of the present invention to provide a process as aforesaid which enables a coated metal article having improved adhesion and durability of the coating.

It is a further object of the present invention to provide a process for treating metals as aforesaid which is inexpensive and readily usable on a commercial scale.

It is a still further object of the present invention to provide a process for treating metals which utilizes a treating solution of low toxicity and low concentration, and which requires only simple pH control.

It is an additional object of the present invention to provide an improved process for treating metals to render the metal more susceptible to further coating treatment, which improved process may be performed if desired with significant time delays prior to the coating process.

In general, it is a particular object of the present invention to provide an improved process as aforesaid which overcomes the substantial and significant disadvantage of conventional treatment procedures.

Further objects and advantages of the present invention will appear hereinafter.

In accordance with the present invention, it has now been found that the foregoing objects and advantages of the present invention may be readily accomplished. The process of the present invention comprises contacting aluminum, including base alloys thereof, for from 5 seconds to one minute, and preferably 7 to 15 seconds, with a solution containing purified water, preferably having a specified resistance of from 0.5 to 4 megohm-centimeters, for example, deionized water or distilled water, and from 0.001 to 0.3% by weight of an amine which maintains an aqueous solution pH in the range of 7 to 11, said solution being at a temperature of from 85° C. to boiling and a pH of 7 to 11.

It has been found that the foregoing simple and convenient process surprisingly achieves all of the foregoing objects of the present invention and attains a greatly improved treatment process and an improved treated metal.

It is a particular and surprising advantage of the present invention that the foregoing process attains such improved results with very short contact times, with in fact the preferred contact times being from 7 to 15 seconds. It is particularly surprising that such improved results can be attained with contact times of such a short duration.

In general, the improved characteristics of the instant treatment process include a process charatcerized by lower concentration, lower chemical cost and easier maintenance and control charactertistics than conventionla processes. In addition, the present process requires only simple pH control as compared to coventional frequent pH monitoring plus frequent titration. In addition, the chemical treatment process of the present invention utilizes lower toxicity materials and an easily handled single component solution, as compared to chromate conversion coating solutions which use highly toxic chromates, fluorides and cyanides at relatively high concentrations. Still further, the delay between the treatment of the present invention and subsequent coating does not present a problem in the present process.

In addition, the present invention attains a greatly improved process for treating metals, as indicated above, that retains the natural appearance of the metal without sacrificing effectiveness of the treatment. This makes possible the use of clean, unpigmented coatings on the metal with better adhesion and durability than was possible heretofore. In addition, the elimination of toxicity makes it easier for the processor who is having difficulty handling and disposing of chromate conversion coating solution. Also, chromate conversion coatings are unsuitable for aluminum cans used for food packaging which require a pretreatment before being lacquered and the present process overcomes this difficulty.

Perhaps of even greater significance is the fact that aluminum treated in accordance with the present process is characterized by improved durability of coatings, such as paint, than has been conventionally attained.

The present invention may be used with any aluminum base alloy, for example, high purity aluminum or aluminum base alloys may be readily used. Exemplificative alloys which may be utilized include but are not limited to aluminum alloys 1100, 2014, 2024, 3003, 3004, 4043, 5005, 5052, 5083, 5086, 6061, 6063, and 7075.

The treatment solution of the present invention is contacted with the aluminum for a period of from 5 seconds to one minute and preferably from 7 to 15 seconds. In fact it has been found that preferred results are obtained in the shorter times of 7 to 15 seconds. The fact that improved results may be obtained with such short treatment times renders the present process particularly suitable to a commercial operation utilizing a roll coating process in, for example, a paint strip line. The roll coating process requires that pretreatment times of the order of 10 to 15 seconds be used since line speeds of 200 to 300 feet per minute practical limits of the length of treatment baths are soon reached. In conventional conversion coating processes, the requirement for short contact times requires the addition of special chemicals, such as fluorides to conversion coating treatments so that the treatment provides sufficient bite to the aluminum surface in the short treatment time available. It is a particular advantage of the present invention that painted aluminum panels pretreated in accordance with the present process at treatment times of less than 15 seconds have shown superior durability performance in accelerated tests despite the absene of special chemicals, such as fluorides.

The treatment solution of the present invention utilizes purified water, i.e., water which has its impurities removed. In general, the water should have a specific resistance of from 0.5 to 4 megohm-centimeters, and preferably from 1½ to 2½ megohm-centimeters. Typical methods for obtaining this purified water include preferably utilizing deionized water or distilled water.

The present process utilizes from 0.001 to 0.3% by weight of an amine. Any amine, either primary, secondary, or tertiary, organic or inorganic may be utilized provided that the amine maintains an aqueous solution pH in the range of 7 to 11. Preferred amines which may be utilized include, but are not limited to the following: diethylenetriamine, ethylenediamine, monoethanolamine, methyl diethanolamine, hydrazine, diethylamine, triethanolamine, amylamine, benzylamine, 1-methylheptylamine, cyclohexylamine, phenethylamine, n-heptylamine, n-hexylamine, diphenylamine, dipropylamine, dibutylamine, diisoamylamine, p-phenylenediamine, o-phenylenediamine, tributylamine, 2-ethylpyridine and 4-ethylpiperidine.

In general, the amine which is used should not be volatile and the preferred amines will maintain a water solution in the pH range 8.9 to 10.8.

The concentration of the amine may vary from 0.001 to 0.3% by weight, with the preferred concentrations being from 0.01 to 0.2% by weight.

It should be noted that the solutions of amines are characterized by a significantly lower order of toxicity in comparison to the chemicals used in conventional conversion coating solutions. In addition, the foregoing solutions of the present invention use lower concentrations of materials than conventional conversion coating solutions, which makes for easier solution handling and obviates waste solution disposal. Furthermore, the solutions of the present invention are characterized by low toxicity, particularly in comparison with conversion coating solutions. A further advantage of the foregoing solutions is the lower chemical costs and treatment costs which they achieve.

The solution should be maintained at a temperature of from 85° C. to the boiling point and a pH of from 7 to 11.

Treatment in accordance with the present process results in a film of from 5 to 200 millimicrons in thickness. This film is an oxide film and is in general uniformly applied in order to provide effective protection against corrosive degradation.

The contact necessary between the aluminum and the treatment solution may be achieved in any desired manner. For example, the contact may be had by immersing the metal in the boiling solution, roll coating the solution or spraying the metal.

It is preferred to utilize aluminum which is clean prior to the treatment. Conventionally, this may be achieved by employing relatively clean aluminum or by preceding the treatment stage with a cleaning stage which uniformly removes dirt or other matter from the surface of the article to be treated. For example, frequently a film of aluminum soap from the rolling lubricant is found on the surface of the aluminum article. All conventional methods of cleaning may be conveniently employed.

Some conventional methods of cleaning which may be used include:

(1) Immerse for 30 seconds in a 10 to 15 percent aqueous solution of sodium hydroxide at 60° C. The surface may be scrubbed with a soft fiber brush if required. Follow with a thorough rinse in clean water.

(2) Dip for 30 to 40 seconds in an aqueous solution consisting of 20 to 30 percent nitric acid and 4 percent sodium fluoride at room temperature. Follow by washing in water.

(3) Immerse for 2 minutes in 5 percent sodium hydroxide at room temperature. Wash in water and then immerse for 30 seconds in 50 percent nitric acid and rinse in water.

(4) Clean with an abrasive brush and rinse thoroughly with water.

The process of the present invention is particularly effective on aluminum which is to be subsequently painted. All types of paints are, of course, contemplated, for example, vinyl, alkyd, acrylic and urethane paint systems. The process of the present invention improves the adhesion and durability of any paint system used on aluminum. In addition, the process of the present invention is quite effective in improving the durability of adhesively bonded structures. In general, the present process represents a significant improvement irrespective of the type of subsequent coating which is to be employed, for example, cladding with a dissimilar metal or alloy or plastic.

It should be particularly noted that the treated aluminum article need not be coated immediately after treatment. The treated aluminum article may be subjected to excessive delays prior to subsequent treatment without impairing the improved characteristics of the coated article.

It should be particularly noted that the process of the present invention is carried out with relatively innocuous materials at very low concentrations so that it is essentially non-toxic. This offers two important advantages over chromate conversion coating. First, solutions are safe to handle and waste disposal is not a problem for the processor. Secondly, the process can be used safely and acceptably for aluminum food cans and containers. In addition, the best chromate conversion coatings produce an uneven yellow color on the metal surface which makes them unsuitable for clear coatings. The process of this invention does not impair the attractive metal appearance, thus making it suitable for use with clear coatings. It should also be noted that the chemistry of our process is relatively simple, whereas that of chromate conversion coating is complex and critical. Thus, this process is easier to control under commercial operating conditions. Also the availability and low cost of the chemicals for carrying out this invention are inexpensive and combined with the low concentrations required offer lower material costs than are available with chromate conversion coatings. Furthermore, the speed with which the objectives of this invention are obtained makes it suitable for continuous type treatment as in a roll coating paint line which may operate up to 300 feet per minute.

The present invention contemplates the use of additional substituents in the treatment solution to achieve particular results, or prior or subsequent treating solutions, for example, suitable wetting agents may be used in the prior cleaning solution to facilitate that operation or the subsequent rinsing solution may be slightly acidified to provide some improvement in the process, particularly on magnesium containing alloys.

The process of the present invention and the improved article resulting and form will be more readily apparent from a consideration of the following illustratives examples.

EXAMPLE I

Aluminum alloy 3003, panels measuring 7" x 4" x 0.025", were cleaned and then rinsed in deionized water. The panels were then immersed in a 0.025% solution of diethylenetriamine in deionized water at 100° C for periods of 7, 8, 9 or 10 seconds. They were then rinsed in deionized water at 60° C. and air dried.

A group of 5 identical panels were cleaned in the same manner and treated with a conventional conversion coating treatment as follows. The conversion coating solution was prepared by utilizing 7.5 grams per liter of solution of a conversion coating solution containing hexavalent chromium and fluoride. The panels were immersed for 15 seconds in an 85° F. conversion coating solution as above maintained at a pH of 1.8 with nitric acid. The panels were then rinsed in deionized water and air dried.

All panels, including the ones treated in accordance with the present invention and the conversion coating panels, were dip coated at a withdrawal rate of 1" per minute with an alkyd base paint. The panels were dried overnight at room temperature, and cured 45 seconds at 500° F.

The panels were then scribed diagonally using a silicon carbide point.

The panels were then exposed for 96 hours to the CASS test. In the CASS test a fine spray of a solution containing 4.2 lbs. sodium chloride, and ten grams cupric chloride in ten gallons of water, adjusted to a pH of 3.2 with glacial acetic acid and at 120° F., is allowed to impringe upon the aluminum surface for the desired period of time. The sample is then removed, cleaned and damage at the scribe lines evaluated. The removal of paint by the corrosive environment generally occurs to expose circular spots of bare metal. The equivalent diameter of these spots is used as a means of evaluating the effectiveness of the pretreatment under test.

Evaluation of paint damage at the scribe lines indicated that all specimens which had been treated in diethylenetriamine (DET) longer gave greater protection against corrosive under-cutting of the paint film than the conversion cotaed samples.

Table I, below gives the relative ratings for the test specimens. Replication was 5 specimens per treatment. The greater the protection conferred by the treatment the lower the numerical rating. The equivalent diameter of exposed metal spots corresponding to the 1 to 5 rating is: Rating 1—equivalent diameter of spot, inch—0 to 1/32; rating 2—equivalent diameter of spot, inch—1/32 to 1/16; rating 3—equivalent diameter of spot, inch—1/16 to 1/8; rating 4—equivalent diameter of spot, inch—1/8 to 1/4; rating 5—equivalent diameter of spot, inch—over 1/4.

TABLE I

| Treatment: | Time of treatment, seconds | Numerical rating of 5 specimens |
|---|---|---|
| DET | 7 | 1, 1, 1, 1, 1 |
| DET | 8 | 1, 1, 1, 1, 1 |
| DET | 9 | 1, 1, 1, 1, 1 |
| DET | 10 | 1, 1, 1, 1, 1 |
| Conversion coated | 15 | 1, 3, 2, 2, 2 |

EXAMPLE II

The following test was made to determine the effectiveness of different amines in the process of the present invention in comparison to a commercial chromate conversion coating. Samples of aluminum alloy were cleaned as in Example I followed by 15 seconds immersion in 100° C. solutions of amines as follows.

TABLE II

| Treatment No.: | Amine | Concentration, wt. percent | Water for solution |
|---|---|---|---|
| 1 | Diethylenetriamine | 0.1 | Deionized distilled water. |
| 2 | Ethylenediamine | 0.1 | Do. |
| 3 | Monoethanolamine | 0.1 | Do. |
| 4 | Methyl diethanolamine | 0.1 | Do. |
| 5 | Hydrazine | 0.1 | Do. |
| 6 | Diethylamine | 0.1 | Do. |
| 7 | Triethanolamine | 0.1 | Do. |
| 8 | Diethylenetriamine | 0.1 | Deionized tap water. |
| 9 | do | 0.025 | Do. |

Duplicate panels of the same aluminum alloy were treated with a conversion coating treatment as in Example I.

All panels were dip coated at 1" per minute with an alkyd paint, and dried and baked as in Example I.

After aging for 4 days, the panels were diagonally scribed through to metal on one surface and CASS tested for 96 hours.

Evaluation of the panels after the CASS exposure showed that all panels treated in accordance with the present invention provided better protection than the conversion coating panels. The results are shown in the following table wherein replication was two specimens per treatment.

TABLE III

| Treatment No. (see Table II): | Numerical rating of 5 specimens |
|---|---|
| 1 | 4, 4 |
| 2 | 4, 4 |
| 3 | 3, 2 |
| 4 | 4, 4 |
| 5 | 1, 1 |
| 6 | 4, 4 |
| 7 | 1, 1 |
| 8 | 3, 3 |
| 9 | 1, 1 |
| Conversion coated | 5, 5 |

EXAMPLE III

The following test was made to determine how well the properties of alloys treated in accordance with the present invention were retained over relatively long times in protected and shop environments.

A group of twelve 3003 aluminum alloy panels were abraded with an abrasive loaded nylon fabric brush, rinsed with deionized water and immersed for 30 seconds in an 0.1% solution of monoethanolamine at 100° C., rinsed with deionized water at 60° C. and air dried.

The panels were stored for a period of about 5 months as follows: Four panels were wrapped in a polyethylene bag and kept in a laboratory; and 8 panels were stacked in a pile in a machine shop. Upon removal, four of the panels which had been stored in the machine shop were cleaned. All 12 panels were then dip coated with an alkyd base paint, dried and cured as in Example I.

The panels were aged for 3 days, diagonally scribed and given a 96 hour CASS exposure as in Example I.

The results showed that all specimens performed equally well, with no visible attack whatever at the scribe lines. The results are shown in the following table.

TABLE IV

| Storage conditions | Treatment before painting | Numerical rating of 4 specimens |
|---|---|---|
| Polyethylene bag | None | 1, 1, 1, 1 |
| Stacked in machine shop | do | 1, 1, 1, 1 |
| Do | Cleaned | 1, 1, 1, 1 |

EXAMPLE IV

The following tests were performed to determine the effectiveness of three (3) chemically different paint systems, i.e., a vinyl, alkyd and acrylic based paint system. Panels of aluminum alloy 3003 were treated as in Example I with 0.025 and 0.1% solutions of hydrazine, triethanolamine and diethylenetriamine.

A group of panels of the same alloy were treated with the conversion coating treatment of Example I. All panels were painted by dip coating at a withdrawal rate of 1" per minute. The painted samples were dried overnight and cured by baking in the following manner.

TABLE V

| Paint system: | Baking schedule |
|---|---|
| Vinyl | 35 seconds at 430° F. |
| Alkyd | 40 seconds at 500° F. |
| Acrylic | 50 seconds at 500° F. |

After aging for 3 days, all panels were scribed diagonally, and CASS tested for 96 hours as in Example I. The results are shown in the following table wherein replication for each particular set of conditions was 5.

TABLE VI

| Paint system | Treatment | Numerical rating of 5 specimens |
|---|---|---|
| Vinyl | Conversion coated | 1, 1, 1, 1, 1 |
| | Hydrazine 0.025% | 1, 1, 1, 1, 1 |
| | Hydrazine 0.1% | 1, 1, 1, 2, 2 |
| | Triethanolamine 0.025% | 1, 1, 2, 1, 2 |
| | Triethanolamine 0.1% | 1, 1, 3, 1, 1 |
| | Diethylenetriamine 0.25% | 1, 1, 1, 1, 1 |
| | Diethylenetriamine 0.1% | 1, 1, 2, 2, 2 |
| Alkyd | Conversion coated | 2, 1, 1, 4, 1 |
| | Hydrazine 0.025% | 1, 3, 1, 1, 1 |
| | Hydrazine 0.1% | 2, 1, 1, 4, 1 |
| | Triethanolamine 0.025% | 1, 1, 1, 1, 1 |
| | Triethanolamine 0.1% | 5, 1, 1, 1, 1 |
| | Diethylenetriamine 0.025% | 1, 1, 1, 1, 1 |
| | Diethylenetriamine 0.1% | 1, 1, 1, 2, 1 |
| Acrylic | Conversion coated | 5, 3, 2, 5, 5 |
| | Hydrazine 0.025% | 1, 2, 1, 2, 1 |
| | Hydrazine 0.1% | 2, 2, 1, 1, 1 |
| | Triethanolamine 0.025% | 1, 1, 1, 1, 1 |
| | Triethanolamine 0.25% | 1, 2, 1, 1, 1 |
| | Diethylenetriamine 0.025% | 1, 2, 1, 1, 1 |
| | Diethylenetriamine 0.1% | 2, 2, 1, 3, 2 |

Results show that for all paint systems the process of the present invention confers protection equal to or better than the conversion coating treatment.

EXAMPLE V

The following example shows the use of the treatment of the present invention on an aluminum alloy 5005. Samples were cleaned and treated in accordance with the present invention as in Example I utilizing solutions containing 0.025% of hydrazine, triethanolamine or ethylenediamine in deionized water at 100° C. Immersion times were 0, 5, 10, 15 and 30 seconds.

All panels were dip coated each and cured as in Example I. After aging for 3 days, the panels were scribed diagonally and CASS tested as in Example I. The results are shown in the following table.

TABLE VII

| Treatment | Numerical rating of 5 specimens |
|---|---|
| Cleaned only, zero immersion time | 5, 5, 5, 5, 5 |
| Hydrazine 5 seconds | 1, 2, 1, 4, 2 |
| Hydrazine 10 seconds | 1, 1, 1, 1, 1 |
| Hydrazine 15 seconds | 1, 1, 1, 1, 1 |
| Hydrazine 30 seconds | 1, 1, 1, 1, 1 |
| Triethanolamine 5 seconds | 1, 3, 1, 1, 2 |
| Triethanolamine 10 seconds | 1, 1, 2, 1, 1 |
| Triethanolamine 15 seconds | 1, 1, 1, 1, 1 |
| Triethanolamine 30 seconds | 1, 1, 1, 1, 1 |
| Diethylenetriamine 5 seconds | 2, 2, 2, 2, 2 |
| Diethylenetriamine 10 seconds | 1, 1, 1, 1, 1 |
| Diethylenetriamine 15 seconds | 1, 1, 1, 1, 2 |
| Diethylenetriamine 30 seconds | 2, 1, 1, 2, 2 |

EXAMPLE VI

The following example illustrates the use of the process of the present invention as a pretreatment for adhesively laminating aluminum with a polyvinyl fluoride film.

Aluminum alloys 3003 in sheet form 6" x 10" x 0.025" were treated in accordance with the process of the present invention as in Example I using a 0.1% solution of monoethanolamine and a 30 second immersion time.

After treatment, the panels were adhesively laminated with a polyvinyl fluoride film. The laminated panels were subjected to accelerated exposures as follows and no deterioration of any specimen was found: 1,000 hours in boiling water; 1,500 hours in 110° F. water; 1,000 hours in 90° F. water; and 100% relative humidity fog; and 1,000 hours in a 5% salt spray.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A process for laminating aluminum or an aluminum base alloy with a plastic film comprising:
    contacting the aluminum or aluminum base alloy for a time period of 5 seconds to less than 15 seconds with a solution selected from the group consisting of amines and hydrazine at a concentration of 0.001 to 0.3% in purified water having a pH of 7 to 11 and a temperautre of 85° C. to boiling, and adhesively laminating the so-treated aluminum with a plastic film.

2. A process according to claim 1 in which the treating agent is a substance selected from the group consisting of hydrazine, triethanolamine and diethylenetriamine.

3. A process according to claim 1 in which the concentration is .01 to .2% by weight.

4. A process according to claim 1 in which the film is a polymeric film.

5. A process according to claim 4 in which the film is a polyvinyl fluoride film.

6. A process according to claim 4 in which the treatment is 7 to less than 15 seconds.

7. A process according to claim 1 in which the purified water is deionized water having a specific resistance of at least 0.5 megohm-centimeters.

8. A process according to claim 1 in which the purified water is distilled water having a specific resistance of at least 0.5 megohm-centimeters.

9. A process according to claim 6 in which the treatment time is about but less than 15 seconds.

References Cited

UNITED STATES PATENTS

| 2,859,148 | 11/1958 | Altenpohl. | |
| 3,247,026 | 4/1966 | Switzer. | |
| 3,304,216 | 2/1967 | Eggleton | 161— 189 X |
| 3,317,336 | 5/1967 | Kennedy et al. | 117—132 |

FOREIGN PATENTS

| 630,229 | 7/1963 | Belgium. |
| 643,501 | 5/1964 | Belgium. |
| 719,680 | 10/1965 | Canada. |
| 1,042,263 | 9/1966 | Great Britain. |

RALPH S. KENDALL, Primary Examiner

U.S. Cl. X.R.

156—60; 161—189, 216

PO-1050
(5/69)

UNITED STATES PATENT OFFICE
CERTIFICATE OF CORRECTION

Patent No. 3,544,391        Dated December 1, 1970

Inventor(s) John A. Scott and William H. Anthony

It is certified that error appears in the above-identified patent and that said Letters Patent are hereby corrected as shown below:

In the heading, on page 1, line 6, after "06518", insert -- assignors to Olin Corporation, a corporation of Virginia --

Signed and sealed this 6th day of April 1971.

(SEAL)
Attest:

EDWARD M. FLETCHER, JR.
Attesting Officer

WILLIAM E. SCHUYLER, JR.
Commissioner of Patents